United States Patent [19]

Takahashi et al.

[11] Patent Number: 5,340,426

[45] Date of Patent: Aug. 23, 1994

[54] APPARATUS AND METHOD FOR ADHERING LIGHT SHIELDING RIBBONS TO A PHOTOGRAPHIC FILM

[75] Inventors: Koichi Takahashi; Haruo Ichikawa, both of Kanagawa, Japan

[73] Assignee: Fuji Photo Film Co., Ltd., Kanagawa, Japan

[21] Appl. No.: 870,685

[22] Filed: Apr. 17, 1992

[30] Foreign Application Priority Data

Apr. 17, 1991 [JP] Japan ................... 3-112417

[51] Int. Cl.⁵ ............................................ B32B 31/00
[52] U.S. Cl. .................................. 156/264; 156/252; 156/320; 156/285; 156/250; 156/293; 264/571; 264/328.8; 425/451; 425/588
[58] Field of Search .................. 156/250, 522, 583.9, 156/517, 519, 552, 264, 285, 320, 499, 568, 519, 521, 252, DIG. 36; 425/451, 588; 264/571, 328.8; 29/121.8

[56] References Cited

U.S. PATENT DOCUMENTS

| 755,829 | 6/1930 | Fox et al. ................. 156/583.9 |
| 4,642,085 | 2/1987 | Helm ........................... 156/519 |
| 4,642,150 | 2/1987 | Stemmler .................... 156/519 |
| 4,891,089 | 1/1990 | Takahashi et al. . | |
| 4,909,885 | 3/1990 | Swenson ...................... 156/519 |
| 4,963,208 | 10/1990 | Muncy et al. ............. 156/583.9 |
| 4,992,125 | 2/1991 | Suzuki et al. ............... 156/519 |
| 5,000,806 | 3/1991 | Merkatoris et al. ........ 156/519 |
| 5,021,111 | 6/1991 | Swenson ...................... 156/519 |
| 5,091,039 | 2/1992 | Ujimoto et al. ............. 156/519 |
| 5,139,714 | 8/1992 | Hettinga ..................... 264/328.8 |

FOREIGN PATENT DOCUMENTS 63-74869 4/1988 Japan .
63-74638 5/1988 Japan .

Primary Examiner—Patrick J. Ryan
Assistant Examiner—Merrick Dixon
Attorney, Agent, or Firm—Sughrue, Mion, Zinn, Macpeak & Seas

[57] ABSTRACT

A ribbon adhering apparatus for a photographic film cassette has a turntable, which has holders fixed circumferentially at a regular pitch. Slidable supporters are mounted on the turntable in correspondence to the respective holders, at positions inward therefrom. Initially in rotation of the turntable, a cassette half of a film cassette is set on an empty holder. Ribbon web is lapped on to support surfaces of supporters arranged adjacently. The web is cut between the supporters to separate ribbons. Sucked and held on the supporter, the ribbon is then heated to activate hot-melt adhesive agent. By advancing the supporter to a holder corresponding thereto, the ribbon is pressed against the cassette half via the adhesive agent. The supporter then stops holding the ribbon. After cooling the adhesive agent, the supporter is withdrawn from the holder, from which the cassette half is removed.

4 Claims, 10 Drawing Sheets

APPARATUS AND METHOD FOR ADHERING LIGHT SHIELDING RIBBONS TO A PHOTOGRAPHIC FILM

BACKGROUND OF THE INVENTION

1. Field of the Invention

The present invention relates to an apparatus and a method for adhering woven or knitted light shielding velvet ribbons to a photographic film cassette, more particularly to an assembling method and apparatus suitable for adhering ribbons in a recess formed in a cassette half molded from plastics.

2. Description of the Related Art

In a conventional photographic cassette (herein referred to as cassette), a metal cassette body rotatably contains a plastic spool around which a photographic filmstrip (herein referred to as film) is wound. The cassette body is constituted of a cylinder made of metal plate and caps fitted on its both sides. A film passageway is formed in the cylinder between a pair of distal edges of the metal plate by bending the edges outward so as to define a spacing therebetween. A pair of strips of woven or knitted velvet ribbons for shielding ambient light, generally called "ribbons" are adhered respectively to these distal edges in order to prevent light from entering the inside of the cassette through the passageway. If the ribbon is shorter than the passageway, light would enter the cassette around the ribbon. In view of this, a ribbon having a length equal to or greater than the length of the cassette body is adhered to the passageway according to a ribbon adhering apparatus as disclosed in U.S. Pat. No. 4,891,089 (corresponding to Japanese Patent Laid-open Publication No. 63-74869).

Recently a cassette having a cassette shell molded from plastics has been utilized. In such a cassette, the cassette shell is constituted from a pair of cassette halves between which the spool is rotatably contained. In such a cassette, a film leader is advanced to the outside through the film passageway when the spool is rotated. In this cassette, the passageway is formed between a pair of channel-shaped recesses formed at the interface of the cassette halves.

However, in the above resinous cassette, the lengthwise range of the passageway is smaller than that of the cassette half. This is so because lateral walls, having a small thickness, must be formed in each cassette half. Accordingly, the above-mentioned ribbon adhering apparatus cannot be employed in a resinous cassette shell. Another ribbon adhering apparatus is disclosed in Japanese Utility Model Laid-open Publication No. 63-74638, in which the length of the ribbon to be adhered can be selected as desired. However, this apparatus also has disadvantages when used with a resinous cassette. In particular, the ends of the ribbon are not easily positioned precisely on the lateral ends of the channel-shaped recess of a resinous cassette half. Thus, lateral gaps may be formed which allow light to enter the cassette. Also, in the apparatus disclosed therein, the cassette must be kept from moving during adhesion of ribbon. This increases the time required for the process of adhering the ribbon to the cassette.

SUMMARY OF THE INVENTION

In view of the foregoing problems, an object of the present invention is to provide an apparatus and method capable of adhering ribbons to a cassette with a high efficiency.

Another object of the present invention is to provide an apparatus and method capable of adhering ribbons to a cassette while eliminating gaps where light may pass through.

In order to achieve the above and other objects and advantages of this invention, an apparatus for adhering a ribbon to an inner portion of a photographic film cassette includes a turntable. Holders are fixed on the turntable and disposed circumferentially at regular intervals, so as to hold the cassette shells in a state such that the inner portion thereof faces a center of the turntable. Supporters press the ribbons respectively against the cassette shell. The supporters are mounted in an inward side of the turntable and are movable in a radial direction of the turntable. Each of the supporters has a support surface for holding the ribbons, which faces to an inner portion of the cassette shell held by a corresponding holder. A supporter shifting device shifts the supporters, in accordance with rotation of the turntable, between a first position remote from the holders and a second position proximate the holders. The support surfaces are arranged at a pitch corresponding to a length of an inner portion of the cassette shell when in the first position, and press the ribbons against the inner surfaces of the cassette shell when in the second position. A feeding means supplies a ribbon web onto the support surfaces when they are set in the first position. A cutter cuts the ribbon web off adjacent thereto, and separates the ribbon therefrom, before the supporter shifts from the first position to the second position.

In the subject method for adhering ribbon to an inner portion of a photographic film cassette shell, a turntable, on which turntable holders are fixed at a regular pitch in an outward side of the turntable, and N slidable supporters are mounted in an inward side of the turntable, is rotated. Cassette shells are set in empty holders. A ribbon web is fed onto circumferential surfaces of supporters arranged adjacently and the web is cut between the respective supporters to separate the ribbon. The ribbon is held on the supporter and heated to activate hot-melt adhesive agent which has been coated on the ribbon. The ribbon is then pressed against the inner portion of the cassette shell by advancing the supporter to a corresponding holder. The supporter is then released from holding the ribbon and withdrawn after the adhesive agent has cooled. The cassette shell is then removed from the holder. In the above described process, hot air, or infrared radiation, etc. can be used for heating the adhesive agent.

In accordance with the present invention, supporters and holders are disposed on a turntable, the supports are shifted toward the holders as the turntable rotates and the ribbon held on the supporters is pressed against a cassette shell set within the holders. The ribbon, therefore, can be adhered with a high efficiency and the time and pressure required for adhering can be accommodated. Because ribbon web is fed onto the supporters while arranged at a pitch corresponding to the length of the inner portion of the cassette shell, and is cut into individual ribbons between the supporters, the ribbon web can be cut off at a predetermined desired length. The supporters are guided by guide rails when advanced to the holders, so that the ribbon will be accurately positioned.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
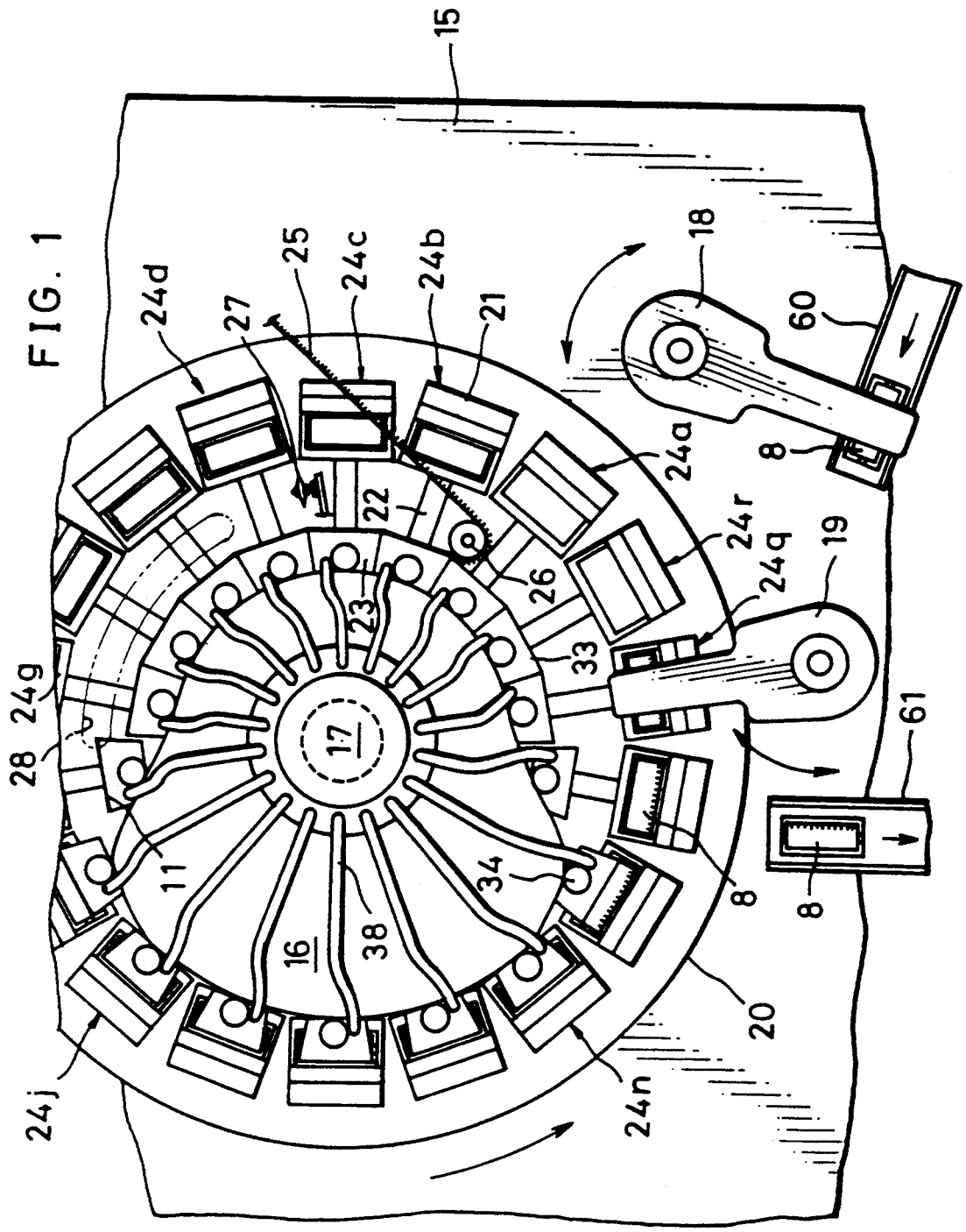
FIG. 1 is a plan view, partially cutaway, illustrating an inside of a ribbon adhering apparatus in accordance with the present invention.

Referring to FIG. 1 illustrating a ribbon adhering apparatus of the invention, a working plate 15 of the apparatus has a shaft 17 protruding therefrom on which a cam plate 16 is rotatably fixed. A component or shell of a cassette body 3 (see FIGS. 8 and 9), being a cassette half 8 or 9, is fed to the apparatus from an inlet chute 60 by a feeder arm 18 mounted on the working plate 15. The following explanation concerning the cassette half 8 similarly applies to the cassette half 9. The cassette half 8 is removed via an outlet chute 61 by a remover arm 19 on the working plate 15, after the ribbon or knitted light shielding member 11 is adhered to the cassette half 8. The shaft 17 supports a turntable 20 in a rotatable manner, which is intermittently rotated stepwise every 20 degrees by a motor and transmission mechanism (not shown), in the counterclockwise direction. Eighteen ribbon supply units 24a, 24b, 24c, ..., 24r radially disposed on the turntable 20 at regular intervals. Each of the ribbon supply units 24a to 24r is constituted of a cassette holder 21 for holding the cassette half 8 and a ribbon supporter 23 for supporting the ribbon 11. The supporters 23 are slidable along a associated guide rail 22. A feeder pully 26, a cutter 27 and a heater 28, are all disposed around the cam plate 16. A light-shielding continuous material or ribbon web 25 is passed around the pulley 26. The cutter 27 cuts the ribbon 11 out of the ribbon web 25. The heater 28 is adapted to blow hot air at the supporter 23 to melt hot-melt adhesive agent 12a (see FIG. 8) coated on the rear surface of the ribbon web 25. The obverse surface of the ribbon web 25 has pile threads and is faced outward from the pulley 26.

In FIGS. 2 to 6 illustrating the ribbon supply unit 24a, a unit base 30 has the guide rail 22 disposed in its lengthwise direction and formed integrally therewith. The holder 21 is formed on the distal end of the unit base 30 in an integral fashion. The unit base 30 is fixed on the turntable 20 by screws 31 t hold the holder 21 at the periphery of the turntable 20. The holder 21 has a recess 32 for receiving and holding the cassette half 8. A support surface 33 is formed on the supporter 23 for supporting the ribbon 11, and has a length equal to, or a slightly shorter than, the length of an inner portion 10 for receiving the ribbon 11 in a film passageway 6 (see FIGS. 8 and 9). Suction holes 33a are formed in the support surface 33 and communicate with a vacuum pump (not shown) of the apparatus to hold the ribbon 11 or the ribbon web 25 by suction. To avoid complicating FIG. 1, the unit base 30 and the screws 31 are omitted therefrom, and the support surface 23 is illustrated in a simplified manner.

Figure 5:
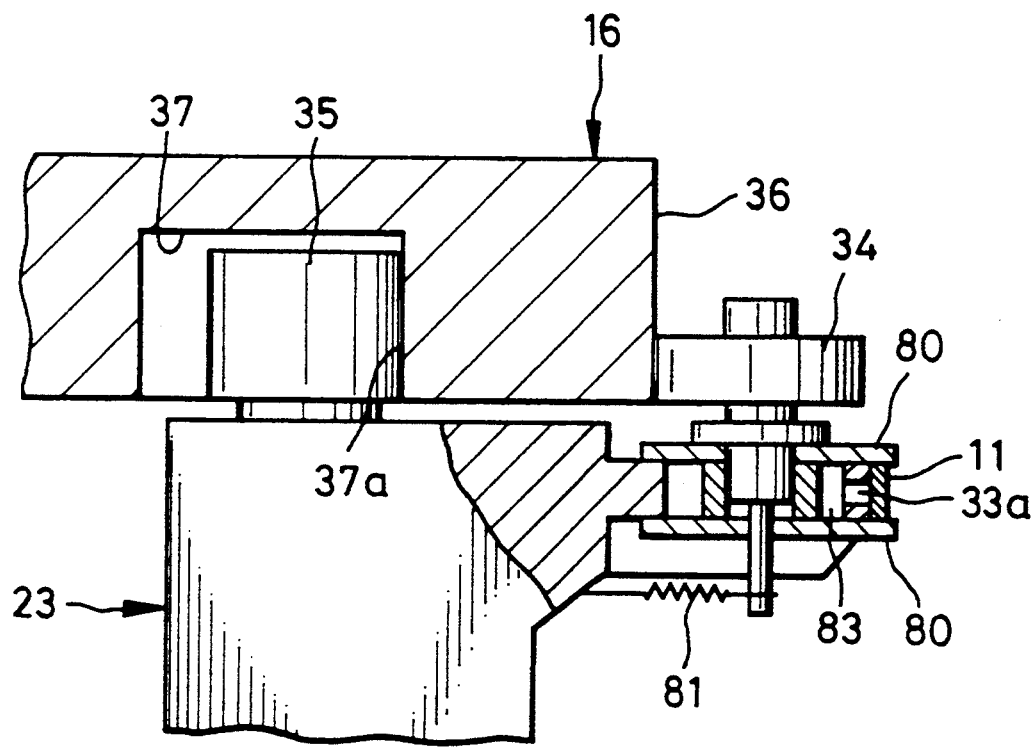
FIG. 5 is an explanatory view illustrating a state where the ribbon is positioned on a support surface of the supporter.
Figure 6:
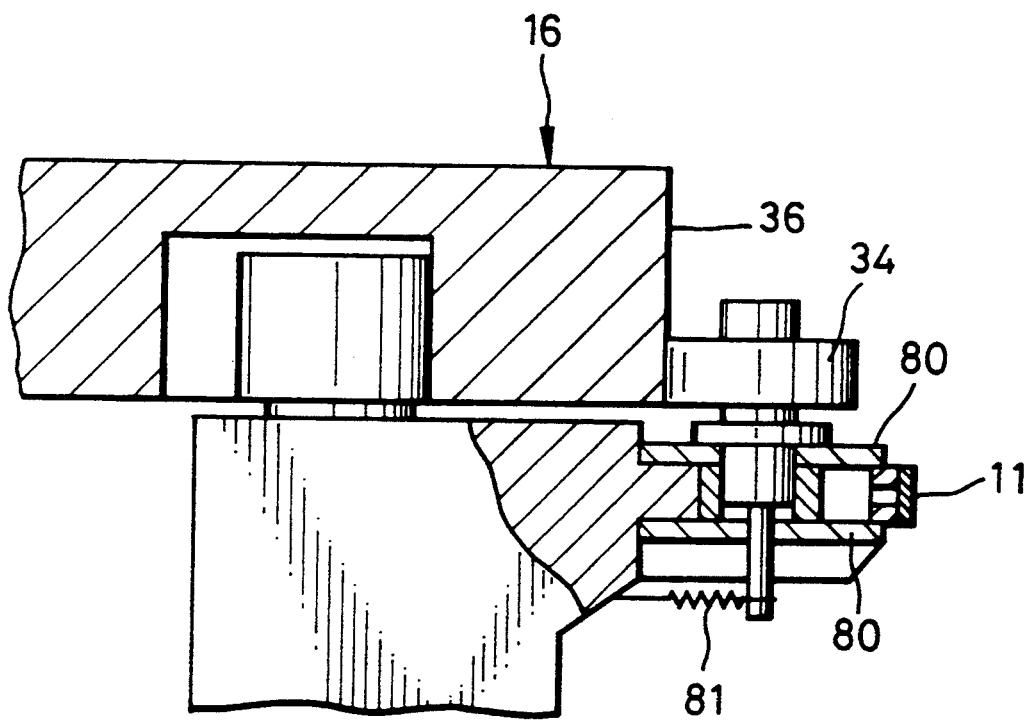
FIG. 6 is an explanatory view illustrating a state where the ribbon is advanced from the supporter.
Figure 7:
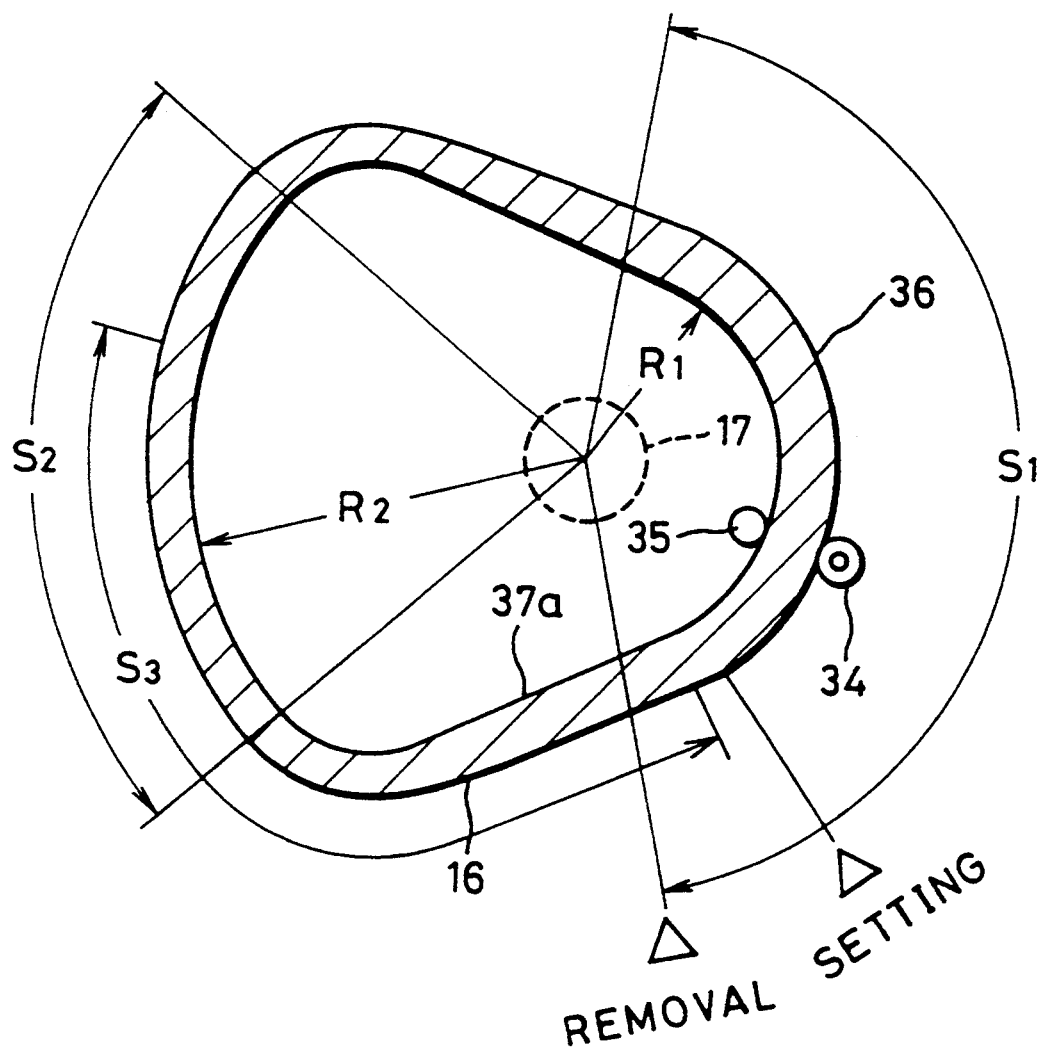
FIG. 7 is an explanatory view illustrating cam surfaces of a cam plate in a horizontal section.

Two rollers 34 and 35 are mounted on the supporter 23. The outer roller 34 is guided by a cam surface 36 formed around the cam plate 16 so as to cause two guide plates 80 to advance against a spring 81. As illustrated in FIG. 5, the guide plates 80 are in contact with both lateral edges of the ribbon 11 to position it in the cassette half 8 which is fixed in the holder 21. When the ribbon 11 is adhered, the guide plates 80, as illustrated in FIG. 6, are retracted to avoid abutment on the cassette half 8. The range in which the guide plates 80 are projected corresponds to Section $S_1$ as illustrated in FIG. 7. The inner roller 35 is guided by a cam surface 37a of a cam groove 37 formed in the cam plate 16, so as to cause the supporter 23 under the bias of the spring 82 to shift from the withdrawn position (first position) of FIG. 3 to the advanced position (second position) of FIG. 4.

The supporters 23 of the ribbon supply units 24a to 24g as illustrated in FIG. 1 assume the withdrawn position so as to continuously connect the adjacent support surfaces 33 with no spacing therebetween. The supporters 23 of the ribbon supply units 24j to 24n assume the advanced position, so that the support surfaces 33 is spaced apart from adjacent support surfaces 33.

Figure 2:
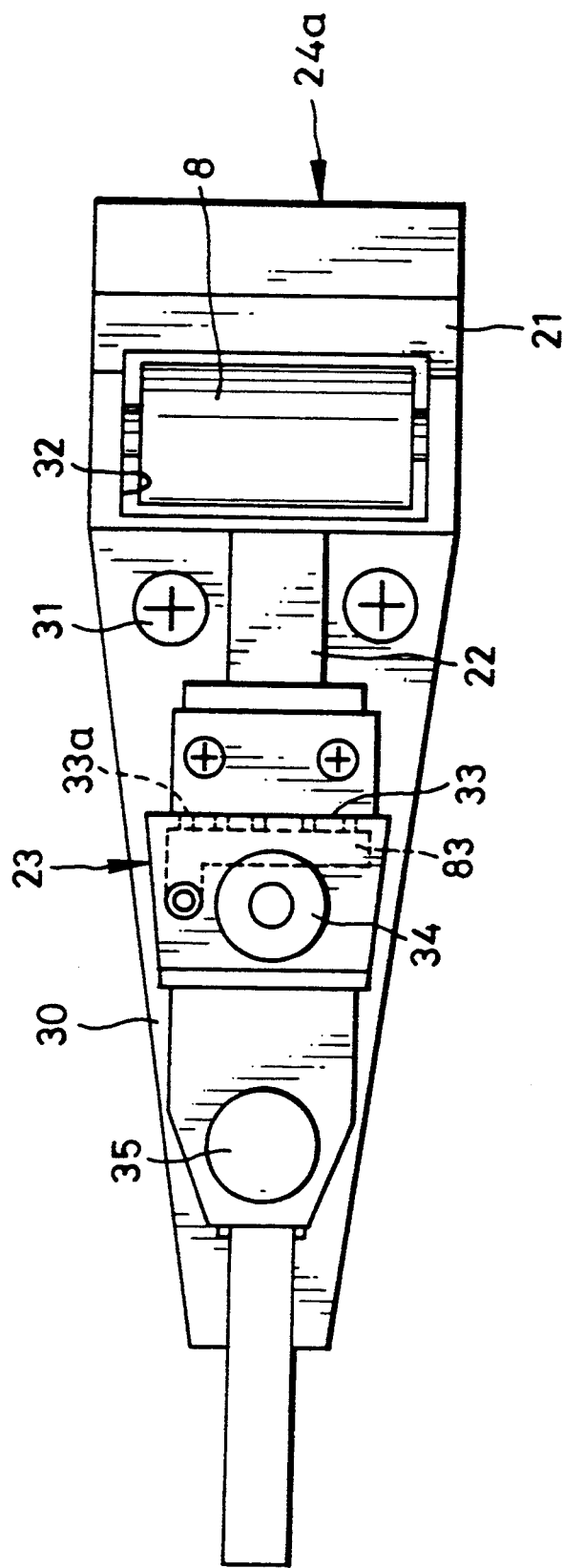
FIG. 2 is a plan view illustrating a ribbon supply unit for adhering ribbon to a cassette half therein.
Figure 3:
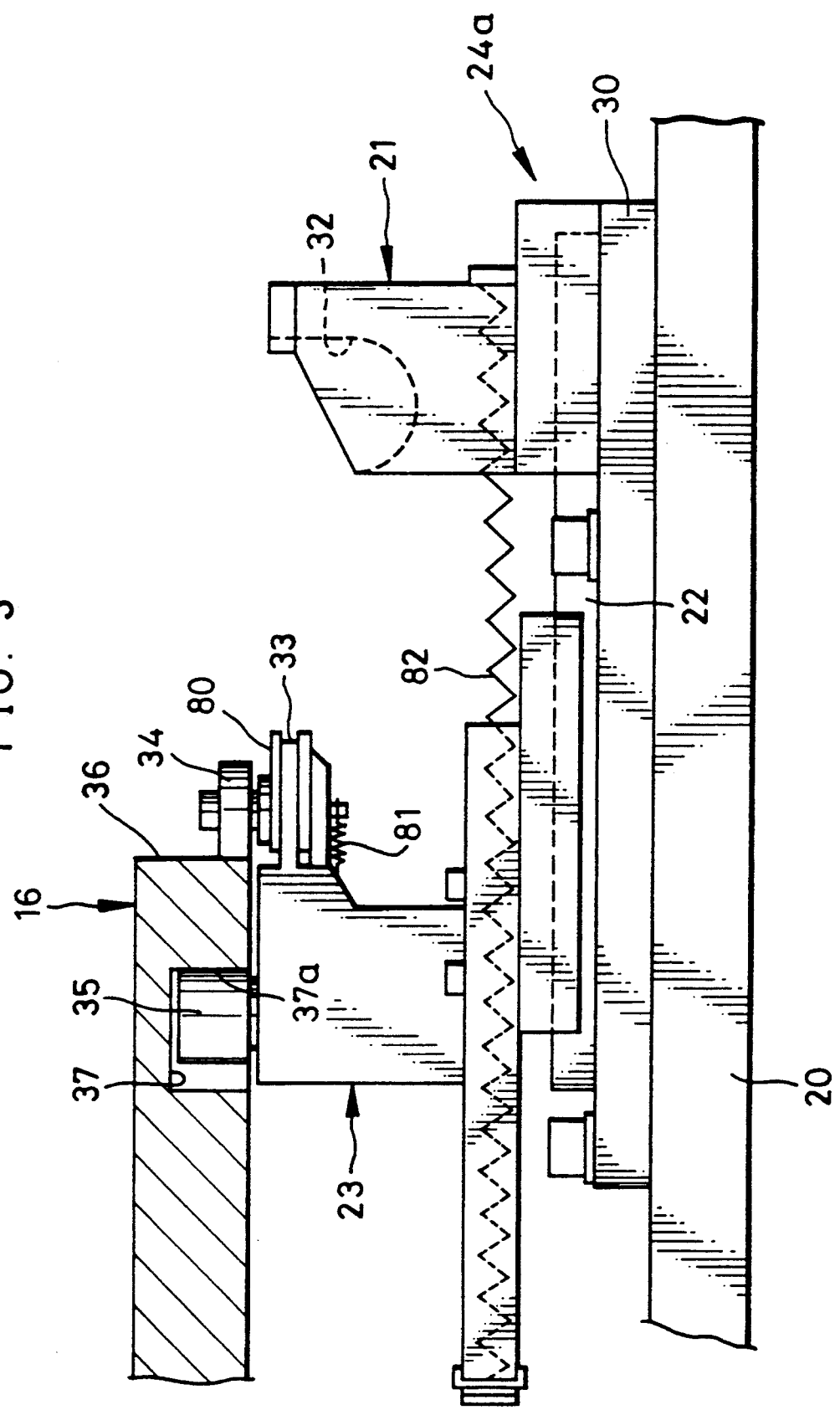
FIG. 3 is an explanatory view illustrating a state where a ribbon supporter is withdraw from a cassette holder.
Figure 4:
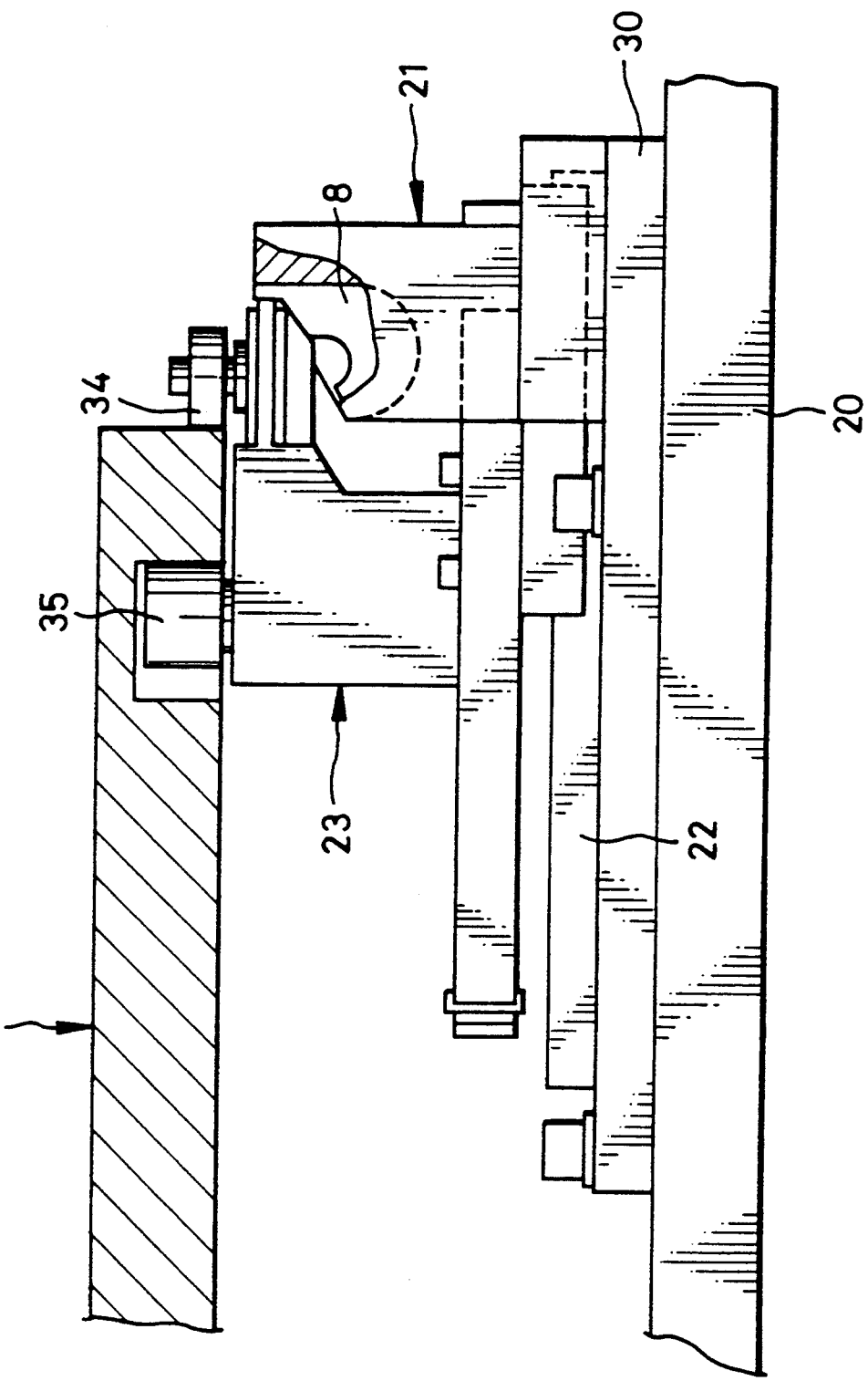
FIG. 4 is an explanatory view illustrating a state where the ribbon supporter is advanced to the cassette holder, thereby pressing the ribbon to the holder.

As illustrated in FIG. 2, the supporter 23 has a chamber 83 enclosed between the guide plates 80 and communicating with the suction holes 33a. A valve mechanism (not shown) is connected to the chamber 83 via flexible tube 38, so as to release the suction which holds ribbon 11.

FIG. 7 illustrates the shapes of the cam surfaces 36 and 37a. In Section $S_1$ the radius of the cam surface 27a is $R_1$ so as to withdraw the supporter 23 and to project the guide plates 80. In Section $S_2$, the radius of the cam surface 37a is $R_2$ larger than $R_1$ so as to advance the supporter 23 and press the ribbon 11 against the inner portion 10 while retracting the guide plates 80. In Section $S_3$, the vacuum suction is stopped, at other positions the suction is activated.

Figure 8:
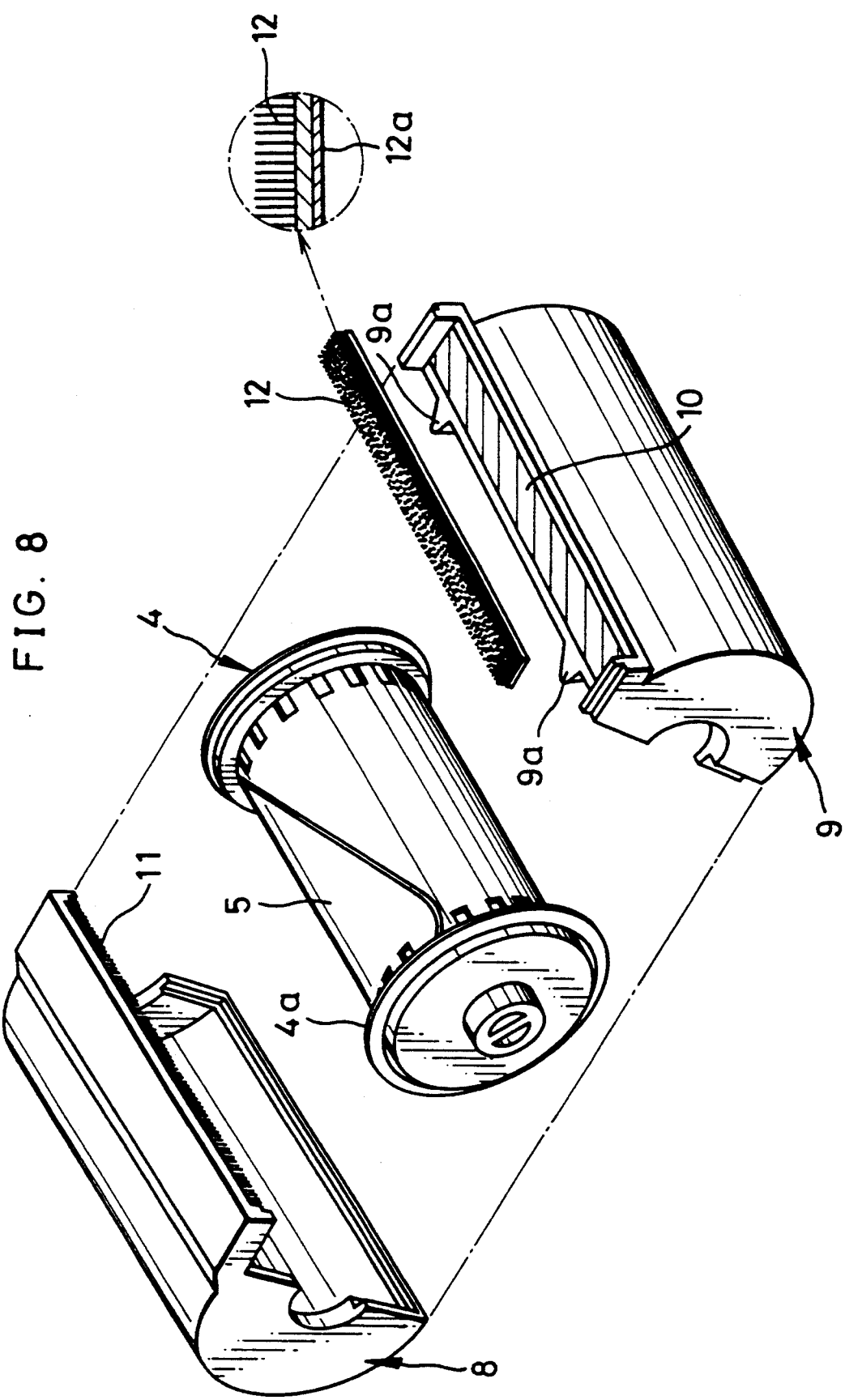
FIG. 8 is an exploded perspective view illustrating a film cassette of which the ribbon is adhered by use of the inventive apparatus.
Figure 9:
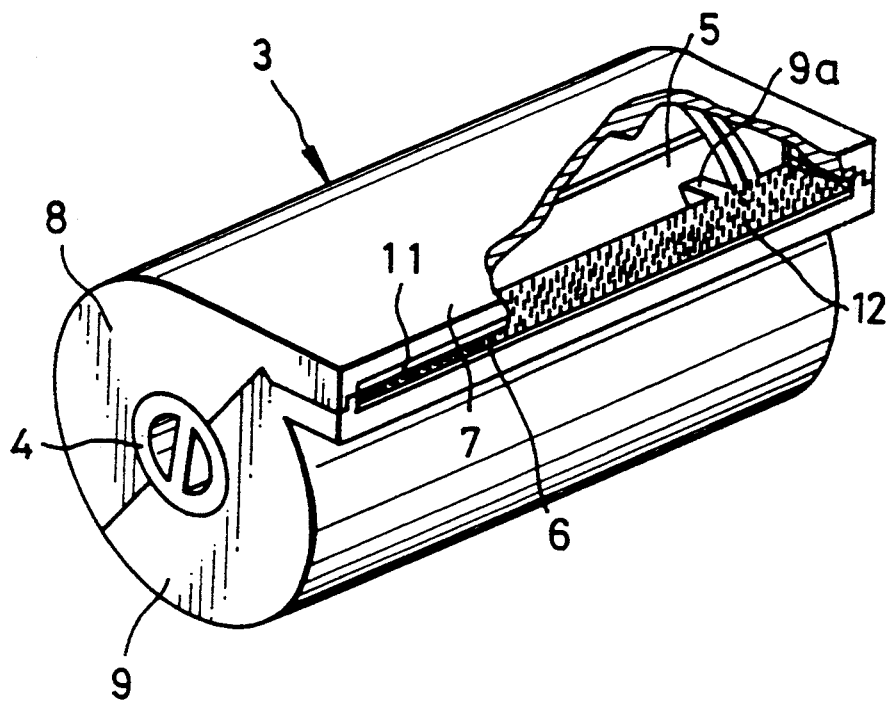
FIG. 9 is a perspective view illustrating the film cassette as assembled.

As illustrated in FIGS. 8 and 9, the cassette includes the cassette body 3, and a spool 4 contained therein. A photographic film 5 is wound on the spool 4 in a roll. The cassette body 3 has a port portion 7 having the film passageway 6 through which the photographic film 5 is advanced from within the cassette body 3. The cassette halves 8 and 9 are molded from resin, and have channel-shaped recesses to be joined to form the passageway 6 inside the port portion 7. Ribbons 11 and 12 are adhered to inner portions of the passageway 6 by use of the adhesive agent 12a. A reference numeral 10 designates the upper inner portion to which the ribbon 11 is adhered. The adhesive agent may be coated on the inner portion 10 instead of being coated on the ribbon 11.

Before use, the leader of the photographic film 5 is fully contained in the cassette body 3. Rotation of the spool 4 in the unwinding direction causes the roll of the photographic film 5, held between flanges 4a, to rotate together with the spool 4. During rotation, the film leader is separated by separator claws 9a and advanced outward through the passageway 6 after exiting from between the flanges 4a. Of course, the present invention is also applicable to a resinous cassette of which the film leader is previously protruded from the cassette body.

Figure 10:
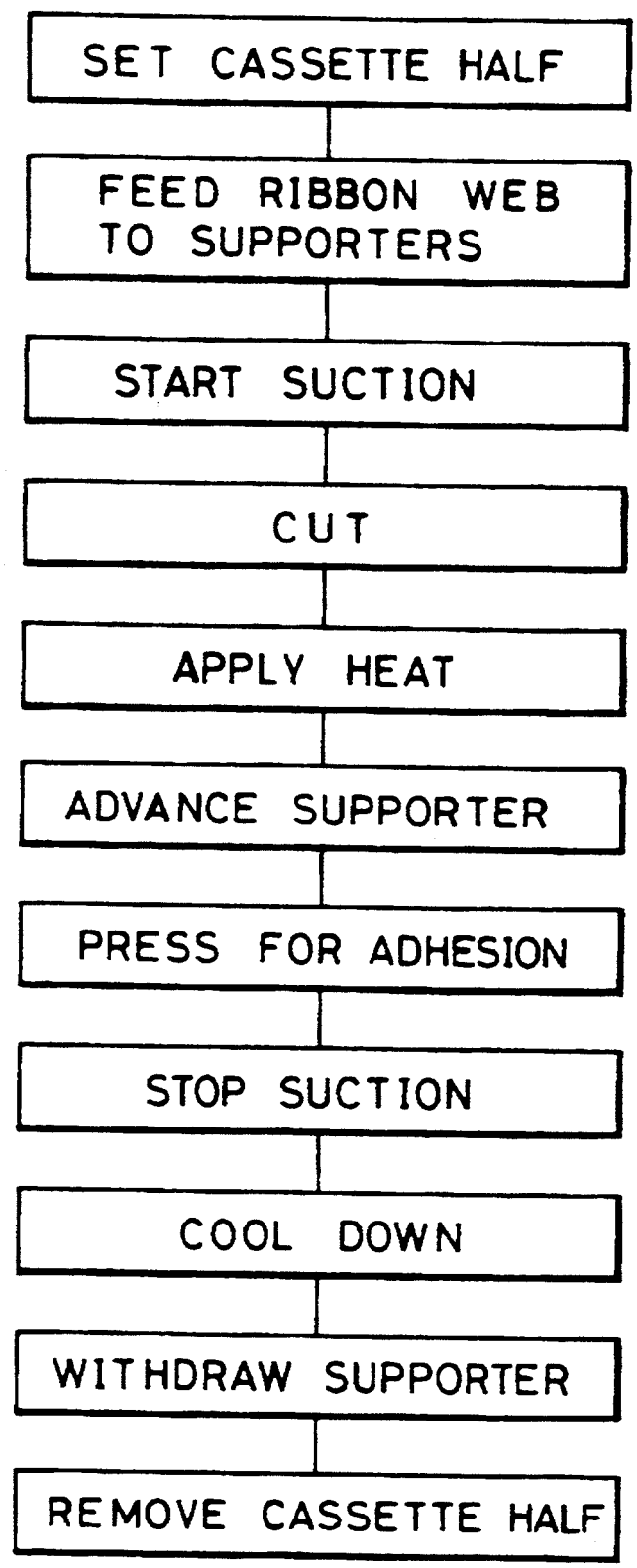
FIG. 10 is a flowchart illustrating the procedure of adhering the ribbon to the cassette.

The operation of the above-constructed ribbon adhering apparatus will now be described with reference to FIG. 10. When the power is supplied to the apparatus, the feeder arm 18 operates to take up the cassette half 8 from the inlet chute 60 and set it in the holder 21 of the ribbon supply unit 24a. A plurality of supporters are arranged side by side in the withdrawn position. The outer roller 34 causes the guide plates 80 to project from the arranged supporters so as to be shaped like a pulley. Positioned by the guide plates 80, the ribbon web 25 after pressing around the feeder pulley 26 is applied to the support surfaces 33. Because the respective supporters 23 are connected to the vacuum pump via the suction tubes 38, the ribbon web 25 is held on the support surfaces 33 by suction. When the turntable 20 is intermittently rotated through step, the ribbon web 25 is drawn to cover a full length of one support surface 33. The pitch between each support surfaces in the withdrawn position is approximately equal to the length of the inner portion 10 of each cassette shell. Then the turntable 20 is rotated through two steps. Downstream from the unit 24c, the cutter 27 is shifted radially inward so as to cut the ribbon web 25. The position of cutting the ribbon web 25 is approximately at the center in the support surfaces 33 of the units 24c and 24d. A similar operation of cutting the ribbon web 25 is carried out during every following step. The ribbon 11 is thus cut and remains on the supporter 23.

The supporter 23 of the ribbon supply unit 24e is supplied with hot air by heater 28. During rotation through three steps after cutting, the adhesive agent 12a on the ribbon 11 is heated and melted by the hot air. As the unit 24g is rotated, the supporter 23 starts to slide toward the holder 21 along the guide rail 22 while the guide plates 80 are retracted by the outer roller 34. In the unit 24j and downstream therefrom, the supporter 23 is shifted to the advanced position of FIG. 4 to press the ribbon 11 against the cassette half 8 for firm adhesion. The pressure is kept until the position of the unit 24n. The suction through the tube 38 is stopped during this pressing. During the pressing, the adhesive agent 12a is cooled down so that the ribbon 11 is completely adhered to the cassette half 8. After the beginning of the pressing, the suction is stopped. The adhesion of the ribbon having been completed, the supporter 23 is withdrawn toward the shaft 17.

While the turntable 20 rotates, the cassette half 8 on the supporter 23 is removed by the remover arm 19, and brought out through the outlet chute 61. After one step of rotating the turntable 20 terminates one cycle of operating the ribbon adhering apparatus.

Although the ribbon 11 is adhered the resinous cassette in the present embodiment, the present invention is also applicable to a conventional cassette having a metal shell. Also, a cooler may be utilized for supplying cool air to the adhesive agent 12a while the pressure is applied to the ribbon.

Figure 11:
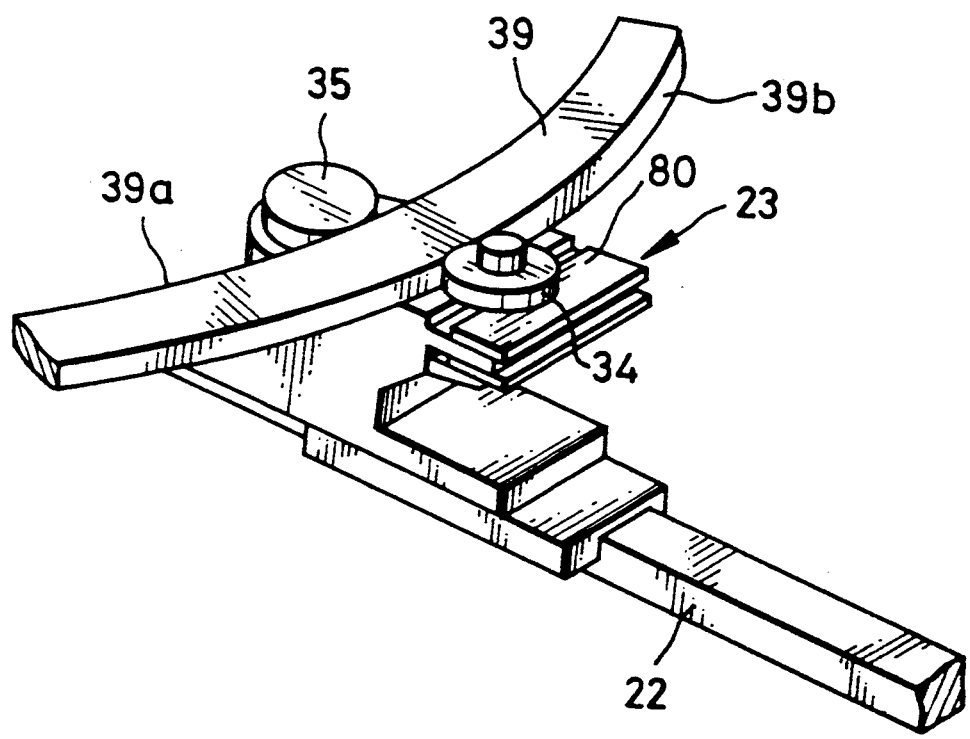
FIG. 11 is a perspective view, partially cutaway, illustrating a cam plate in accordance with another preferred embodiment.
Figure 12:
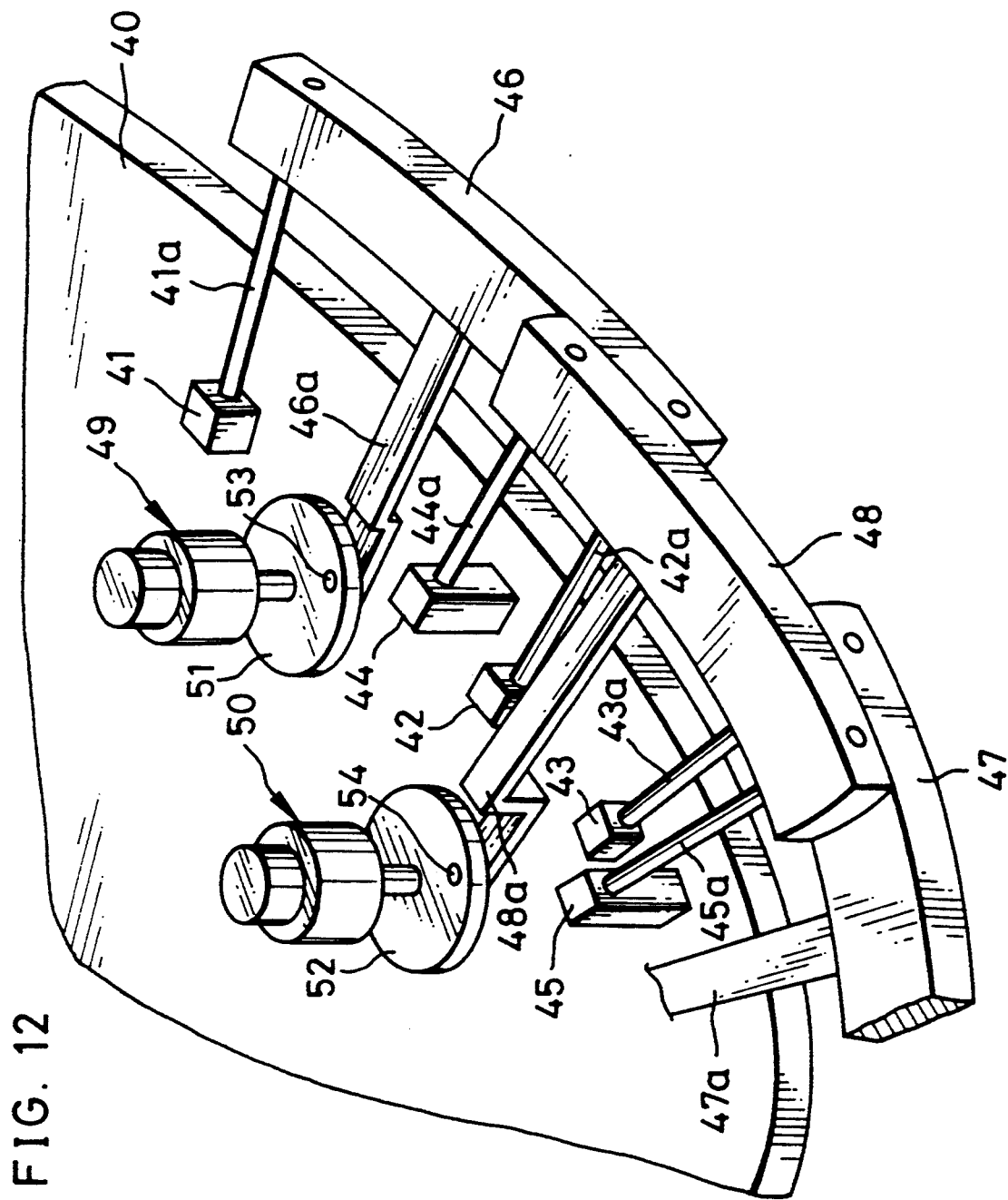
FIG. 12 is a perspective view, partially cutaway, illustrating a cam mechanism of which the cam surface has a variable shape.

FIG. 11 illustrates a second preferred embodiment in which a loop-shaped cam plate 39 is used in place of cover plate 16. an inner cam surface 39a of the cam plate 39 is in contact with the inner roller 35. The outer roller 34 is in contact with an outer cam surface 39b of the cam plate 39. FIG. 12 illustrates another embodiment in which the radius of a cam is variable. A cam base plate 40 has brackets 41 to 45 formed integrally therewith. The brackets 41 to 43 have a height smaller than the brackets 44 and 45. On the brackets 41 to 45 are fixed respective shafts 41a to 45a disposed radially. Arc-shaped cam plates 46 and 47 have holes in which the shafts 41a, 42a and 43a are respectively inserted, and are slidable with respect to the shafts. An arc-shaped cam plate 48 is mounted on the upside of the cam plates 46 and 47, and slidably receives the shafts 44a and 45a. Three rods 46a and 48a are connected to the cam plates 46 to 48 respectively. The proximal ends of the rods 46 and 47 are coupled with disks 51 and 52 via pins 53 and 54. The disks 51 and 52 are rotated by stepping motors 49 and 50. In the cam mechanism thus constructed, the cam plates 46 and 48 can be shifted outward by the motors 49 and 50 via the rods 46a and 48a when the motors 49 and 50 rotate clockwise.

According to this embodiment, the cam surface is shaped differently to enlarge the radius $R_1$ or else the radius of the cam surface 36 within Section $S_1$. When set in the withdrawn position, the adjacent supporters 23 can be spaced apart at a small distance as desired. Therefore, the ribbon web 25 can be cut into the ribbon 11 at a predetermined length slightly larger as desired than in the manner of the former embodiments. In the case where pins 53 and 54 rotate counterclockwise, the pitch between the supporters 23 is reduced enabling the length of ribbon to be shorter.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method for adhering a ribbon to an inner portion of a photographic film cassette shell, comprising the steps of:

rotating a turntable on which N holders are fixed at a regular pitch, and N slidable supporters are mounted on said turntable, N is an integer;

setting said cassette shell on an empty holder which is at a position of feeding;

supplying ribbon web onto circumferential surfaces of supporters arranged adjacently;

cutting said ribbon web between said respective arranged supporters to separate said ribbon;

holding said ribbon on said supporter;

heating said ribbon to activate hot-melt adhesive agent coated on said ribbon;

pressing said ribbon against said inner portion of a cassette shell via said adhesive agent by advancing said supporter to a holder corresponding thereto;

releasing said supporter from said holding of said ribbon;

withdrawing said supporter after cooling said adhesive agent; and removing said cassette shell from a processed holder which is at a position of removal.

2. A method as defined in claim 1, wherein said cassette shell is one of a pair of cassette halves molded from plastics, said respective cassette halves have a channel-shaped recess for forming a film passageway with ribbons, and said ribbon is adhered in said recess.

3. A method as defined in claim 2, wherein said supporter holds said ribbon web and said ribbon by vacuum suction.

4. A method as defined in claim 3, wherein said heating step is applied directly to said adhesive agent.

* * * * *